Jan. 25, 1944.  B. G. CARLSON  2,340,041
AUTOMATIC BANK CONTROL
Filed Feb. 2, 1942

INVENTOR.
BERT G. CARLSON.
BY
ATTORNEY.

Patented Jan. 25, 1944

2,340,041

UNITED STATES PATENT OFFICE 2,340,041

AUTOMATIC BANK CONTROL

Bert G. Carlson, Erieside, Ohio, assignor to Jack & Heintz, Inc., Cleveland, Ohio Application February 2, 1942, Serial No. 429,208

5 Claims. (Cl. 244—76)

This invention pertains to an automatic bank control mechanism for use with an automatic pilot on an aircraft, to effect proper banking of the aircraft in turns and to maintain a level attitude about the longitudinal axis of the craft in straight forward flight.

In the type of automatic pilot disclosed in the patent to myself and others, No. 1,992,970, issued March 5, 1935, a knob, or crank, is provided in association with the gyro compass to turn the aircraft through the agency of the automatic pilot, and additional knobs are provided for manual adjustment of the attitude of the craft about its longitudinal and lateral axes. In the conventional manner of executing a turn with this type of automatic pilot the turn is cranked into the directional control, and then the craft is banked by constant manipulation of the banking knob until the turn is completed, rotation of the banking knob in one direction or the other being effective to adjust the follow-up mechanism connected with the ailerons in the manner illustrated in said patent.

The object of the present invention is to provide an automatic mechanism, responsive to the resultant of the accelerations of gravity and centrifugal force in a turn, to operate the shaft of the banking knob in an automatic pilot of the type described so as to properly bank an aircraft in turns and maintain a level attitude about the longitudinal axis in straight forward flight.

A particular object is to provide a device which may be constructed as an accessory mechanism for application to the horizon box of a conventional automatic pilot to operate the shaft of the banking knob therein, by pendulum means, to provide automatic banking of an aircraft in turns.

Figure 2:
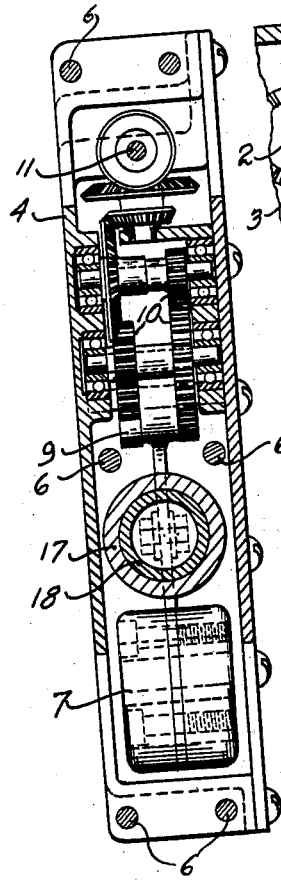
Figure 1:
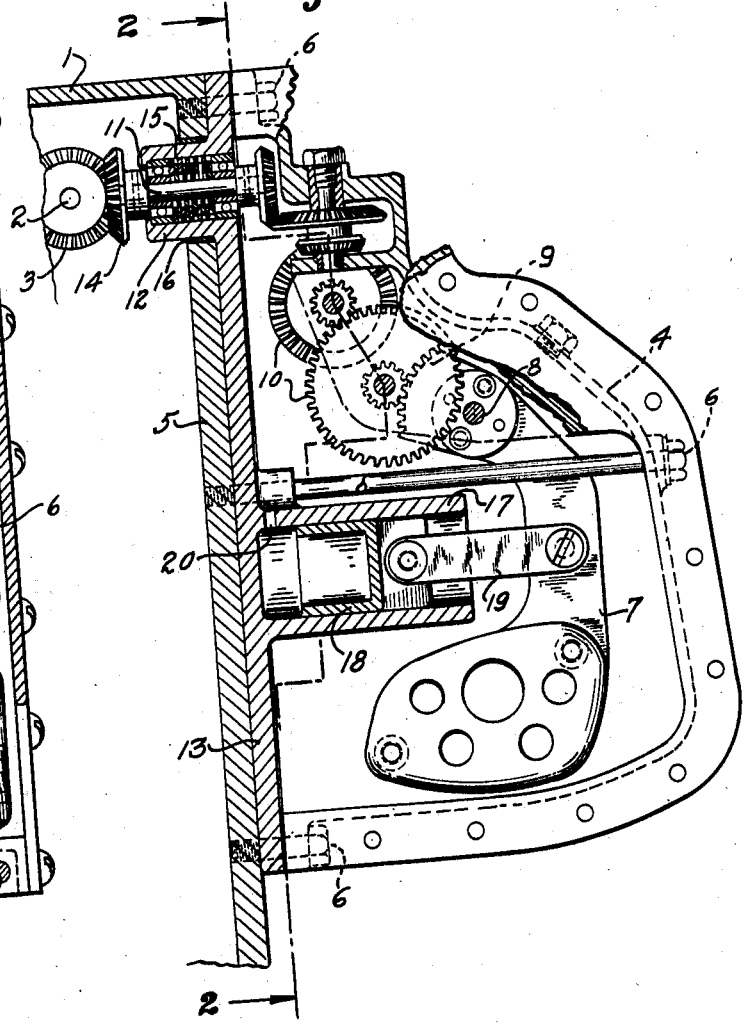

These and other objects will be apparent as the description proceeds in connection with the accompanying drawing, in which:

Figure 1 is a vertical sectional view through a preferred embodiment of the present invention, illustrating the manner of its application to the horizon box of an automatic pilot, and Figure 2 is a sectional view taken on the line 2—2 of Fig. 1.

In the drawing the numeral 1 indicates the horizon box in a conventional automatic pilot such as that disclosed in the aforementioned Patent No. 1,992,970. Within the horizon box is a banking shaft 2 for adjusting the follow-up mechanism connected with the aileron control, which shaft in the conventional automatic pilot of the type described is manually operable by means of a knob on the front side of the horizon box. This structure is old in the art and does not in itself constitute a part of the present invention.

The present invention comprises a device containing a pendulum responsive to the accelerations of gravity and centrifugal force in turns for rotating the banking shaft 2 to accomplish the automatic banking of the aircraft in turns. The mechanism of the invention is contained within a casing 4 adapted to be secured to a vertical wall 5 of the horizon box 1 adjacent the banking shaft 2 by means of bolts 6. A pendulum 7 is pivotally mounted upon a shaft 8 in the casing 4 in a position parallel with the longitudinal axis of the aircraft upon which the device is installed. A gear segment 9 on the pendulum 7 drives a gear train 10 which is ultimately connected with a shaft 11 extending through a tubular boss 12 in a vertical wall 13 of the casing 4. The shaft 11 carries at its outer extremity a bevel gear 14 adapted to drive a similar bevel gear 3 which may be mounted on the shaft 2. Suitable antifriction bearings are provided for mounting the pendulum, the components of the gear train 10 and the shaft 11.

Inasmuch as the interior of the horizon box 1 is normally maintained under reduced pressure, a seal 15 having negligible mechanical friction is provided between the shaft 11 and the boss 12 to prevent the entrance of air into the horizon box. The boss 12 projects into the horizon box through an opening 16 in the wall 5, which opening may be sealed around the boss 12 in any conventional manner. If desired, a gasket or other form of sealing material may be clamped between the wall 13 and the wall 5, and this sealing material may in itself suffice to adequately seal any existing space around the boss 12 and the opening 16.

Damping means are provided for the pendulum, comprising a cylinder 17 and a piston 18 connected with the pendulum by means of link 19. A small aperture 20 is provided in the cylinder 17 so that when the casing 4 is filled with oil or other damping fluid above the level of cylinder 17, the resistance to fluid flow through the aperture 20 will exert a damping effect upon oscillations and sudden movements of the pendulum 7.

In Figure 1 the pendulum 7 is illustrated hanging in its normal neutral or vertical position as in straightforward level flight, subject only to the acceleration of gravity. When the aircraft is turned, the resulting centrifugal force will tend to cause initial movement of the pendulum in one direction away from this position, causing appropriate rotation of the banking shaft 2 and thereby producing movement of the ailerons of the aircraft to properly bank the aircraft. When the aircraft has assumed the proper angle of bank, the vertical direction in the drawing will be then inclined to coincide with the line of the resultant forces acting on the pendulum, causing the pendulum to return to the neutral position shown, so that no further banking effect will be produced. The pendulum will depart from its neutral position to exert a controlling effect whenever this equilibrium is upset by some outside factor such as, for instance, a change in speed or rate of turn of the aircraft.

In coming out of a turn, as the rate of turn is lessened, the pendulum will tend to fall in a direction opposite to that of its initial movement, producing rotation of the banking shaft 2 in a direction to reduce the angle of bank for the lesser rate of turn. The controlling action exerted by the pendulum in the manner just described will be continuous throughout the turn and will operate to maintain the proper banking angle at all times. When a turn is executed in the opposite direction the pendulum will initially tend to swing in the other direction from the neutral position shown, resulting in an opposite direction of movement of the ailerons to properly bank the aircraft in the same manner.

The device of the present invention also has a particular utility in maintaining the aircraft level laterally in straight forward flight, which may be considered as the special case of zero angle of bank in a turn of infinite or very long radius. Whereas in a turn the pendulum 7 may be said to tend to assume an inclination corresponding to the virtual vertical, in straight forward flight free of lateral accelerations the pendulum will indicate the true vertical and will operate the shaft 2 as required to adjust the ailerons so as to maintain the aircraft level laterally. The automatic pilot itself is theoretically operable to hold the craft level laterally, but its operation departs from the theory because of the false assumption that an aircraft is a perfectly rigid structure of unvarying dimensions. It is found in practice that changes in temperature, changes in loading, and the like, in large aircraft are effective to appreciably disturb the tensions and lengths of the control cables with respect to the structure of the aircraft. Such variations are transmitted back to the follow-up mechanisms on the gyro controls so as to affect the attitude of the craft. Thus the dimensional variations in long structural and control members of dissimilar materials subjected to temperature changes of considerable degree, and deflections of the wings and fuselage of a large airplane upon release or shifting of the load, may, for instance, slightly shift the air ports in the gyro aileron control in such a manner as to cause the airplane to fly with one wing low. The effect is the same as if the aileron control shaft 2 were rotated out of its set position, the plane thereafter tending to continue in its new attitude with one wing down until this condition comes to the attention of the pilot and is corrected by manual rotation of the control knob. In the present invention the pendulum 7 operates continuously to correct any such condition without requiring the attention of the pilot.

The type of device illustrated and described may be constructed as an accessory mechanism for application to the horizon boxes of automatic pilots already in existence, or it may be incorporated into future automatic pilots at the time of their fabrication as an integral element thereof. In the latter case the horizon box may be designed with space to accommodate the present mechanism therewithin, or the side wall 5 may be modified to envelop the present mechanism so as to obviate the necessity for gaskets, seals and the like.

While I have shown and specifically described but a single embodiment of my invention, it is to be understood that it is capable of many modifications. Further changes, therefore, in the construction and arrangement may be made which do not depart from the spirit and scope of the invention as defined in the appended claims.

I claim:

1. An automatic bank control for aircraft comprising a casing, a pendulum in said casing, means for mounting said casing on the horizon box of an automatic pilot with the axis of said pendulum parallel with the longitudinal axis of said craft, means for damping the movements of said pendulum, a gear train operable to magnify the motions of said pendulum, a tubular boss projecting outwardly from said casing, a shaft driven by said gear train and extending through said boss, and sealing means around said shaft to prevent air passing through said boss.

2. In an automatic pilot of the type having a rotatable banking shaft for adjusting a follow-up mechanism connected with the aileron control of an aircraft, an automatic bank control unit comprising a pendulum mounted for responsive movement to the accelerations of gravity and centrifugal force for determining the proper angle of bank for said aircraft, means for damping the movements of said pendulum, a gear train operable to magnify the motions of said pendulum, and a shaft driven by said gear train for driving said banking shaft to bank said aircraft in accordance with the movements of said pendulum, said unit being bodily attachable to and removable from said automatic pilot.

3. An automatic bank control unit for use with an automatic pilot of the type having a horizon box containing a manually rotatable banking shaft for adjusting a follow-up mechanism connected with the aileron control of an aircraft, comprising a casing adapted to be externally secured to the horizon box of said automatic pilot adjacent said banking shaft, a pendulum in said casing pivoted for response to the accelerations of gravity and centrifugal force from the turning of said aircraft to determine the proper angle of bank, a cylinder in said casing, an orifice in said cylinder, a piston operable in said cylinder by movements of said pendulum, a gear segment rotatable by said pendulum, a gear train for multiplying the movements of said gear segment, a shaft driven by said gear train and extending through said casing into proximity with said banking shaft when said casing is secured to said horizon box, and a gear on said shaft for driving said banking shaft, said unit being bodily attachable to and removable from said horizon box.

4. In an automatic pilot of the type having a horizon box containing a banking shaft rotatable in opposite directions to control the lateral stability of an aircraft, an automatic bank control unit for rotating said shaft in the manner described comprising a pendulum responsive to gravitational and lateral accelerations and movable in opposite directions from a central neutral position, a dash pot damping device connected with said pendulum, and a gear train operated by movements of said pendulum and connected with said shaft whereby the turning of said aircraft in one direction will swing said pendulum in one direction from said neutral position, and the turning of said aircraft in the opposite direction will swing said pendulum in the opposite direction from said neutral position to properly bank said aircraft at all times, said unit being bodily attachable to and removable from said horizon box.

5. An automatic bank control unit for use with an automatic pilot of the type having a horizon box containing a manually rotatable banking shaft for adjusting a follow-up mechanism connected with the aileron control of an aircraft, comprising a casing, a flat side on said casing, means for securing said flat side against a wall of said horizon box, a tubular boss projecting outwardly from said flat side and adapted to enter an opening in the wall of said horizon box adjacent said banking shaft, a pendulum pivoted in said casing for response to the turning of said aircraft in flight, a cylinder in said casing on said flat side, a piston in said cylinder connected with said pendulum to damp the movements thereof, a gear segment rotatable by said pendulum, a gear train in said casing for multiplying the movements of said gear segment, a shaft carried by bearings in said boss and driven by said gear train, a gear on said shaft outside of said casing for rotating said banking shaft by movements of said pendulum in response to turning of said aircraft, and sealing means in said boss around said shaft to prevent admission of atmospheric pressure into said horizon box.

BERT G. CARLSON.